US011978603B2

(12) United States Patent
Murata et al.

(10) Patent No.: US 11,978,603 B2
(45) Date of Patent: May 7, 2024

(54) ELECTROMAGNETIC RELAY

(71) Applicant: OMRON Corporation, Kyoto (JP)

(72) Inventors: Keisuke Murata, Kyoto (JP); Tatsuro Kitagawa, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 0 days.

(21) Appl. No.: 17/847,169

(22) Filed: Jun. 23, 2022

(65) Prior Publication Data

US 2023/0005688 A1 Jan. 5, 2023

(30) Foreign Application Priority Data

Jul. 5, 2021 (JP) ................................. 2021-111451

(51) Int. Cl.
*H01H 50/28* (2006.01)
*H01H 50/04* (2006.01)
*H01H 50/44* (2006.01)

(52) U.S. Cl.
CPC .......... *H01H 50/042* (2013.01); *H01H 50/28* (2013.01); *H01H 50/443* (2013.01)

(58) Field of Classification Search
CPC .... H01H 50/042; H01H 50/28; H01H 50/443; H01H 50/38; H01H 9/443; H01H 50/043; H01H 50/26; H01H 50/548; H01H 50/641; H01H 50/041; H01H 50/14; H01H 50/16; H01H 50/54
USPC .......................................................... 335/201
See application file for complete search history.

(56) References Cited

U.S. PATENT DOCUMENTS

| | | | | |
|---|---|---|---|---|
| 2002/0135446 A1* | 9/2002 | Takano | H01H 50/026 | 335/128 |
| 2005/0040920 A1* | 2/2005 | Takano | H01H 50/043 | 335/128 |
| 2005/0057332 A1* | 3/2005 | Nakamura | H01H 50/042 | 335/78 |
| 2010/0066471 A1* | 3/2010 | Nagura | H01H 9/047 | 335/201 |
| 2011/0181381 A1* | 7/2011 | Sasaki | H01H 50/54 | 335/78 |
| 2020/0126744 A1* | 4/2020 | Kitagawa | H01H 50/023 | |
| 2021/0012993 A1* | 1/2021 | Miyake | H01H 50/26 | |
| 2021/0366678 A1* | 11/2021 | Miyake | H01H 50/026 | |

FOREIGN PATENT DOCUMENTS

JP 2019-175603 A 10/2019

* cited by examiner

*Primary Examiner* — Shawki S Ismail
*Assistant Examiner* — Lisa N Homza
(74) *Attorney, Agent, or Firm* — SHINJYU GLOBAL IP

(57) ABSTRACT

An electromagnetic relay includes a base, a fixed terminal, a fixed contact, a movable piece, a movable contact, a magnet, a base holder, and a case. The fixed terminal is supported by the base. The fixed contact is connected to the fixed terminal. The movable piece is supported by the base. The movable contact is connected to the movable piece and faces the fixed contact. The magnet exerts a Lorentz force on an arc generated between the fixed contact and the movable contact. The base holder is a separate body from the base. The base holder is attached to the base. The base holder is disposed in at least a direction in which the Lorentz force acts with respect to the base. The case is attached to the base holder.

8 Claims, 9 Drawing Sheets

ELECTROMAGNETIC RELAY

CROSS-REFERENCE TO RELATED APPLICATION

This application claims priority to Japanese Patent Application No. 2021-111451, filed Jul. 5, 2021. The contents of that application are incorporated by reference herein in their entirety.

FIELD

The present invention relates to an electromagnetic relay.

BACKGROUND

For example, as shown in Japanese Laid-Open Patent Application publication No. 2019-175603, an electromagnetic relay includes a fixed contact and a movable contact. When the movable contact contacts the fixed contact, electricity flows between the movable contact and the fixed contact. When the movable contact is separated from the fixed contact, electricity is cut off between the movable contact and the fixed contact. The fixed contact is connected to the fixed terminal. The movable contact is connected to the movable piece. The fixed terminal and the movable piece are supported by the base. A case is attached to the base.

On the other hand, some electromagnetic relays are equipped with a magnet for extinguishing an arc. Due to the magnetic field from the magnet, Lorentz force acts on the arc generated between the fixed contact and the movable contact. The arc is quickly extinguished by being stretched by the Lorentz force.

SUMMARY

In order to extinguish the arc quickly, it is desirable to have a large space around the contacts. Therefore, for example, by enlarging the base, a wide space is provided around the contacts. However, the base is a component that defines the positional relationship between the fixed terminal, the fixed contact, the movable piece, and the movable contact, and high dimensional accuracy is required. Therefore, it is not easy to redesign the base. In addition, when the shape of the base is changed, it is necessary to newly design a production line for electromagnetic relays. In that case, the manufacturing cost increases. An object of the present invention is to expand a space for extinguishing an arc in an electromagnetic relay while suppressing an increase in manufacturing cost.

An electromagnetic relay according to one aspect of the present invention includes a base, a fixed terminal, a fixed contact, a movable piece, a movable contact, a magnet, a base holder, and a case. The fixed terminal is supported by the base. The fixed contact is connected to the fixed terminal. The movable piece is supported by the base. The movable contact is connected to the movable piece and faces the fixed contact. The magnet exerts a Lorentz force on an arc generated between the fixed contact and the movable contact. The base holder is a separate body from the base. The base holder is attached to the base. The base holder is disposed in at least a direction in which the Lorentz force acts on the base. The case is attached to the base holder.

In the electromagnetic relay according to the present aspect, the base holder is disposed in at least a direction in which the Lorentz force acts on the base. Therefore, in the case, a space for extinguishing the arc is expanded in the direction in which the Lorentz force acts. The base holder is a separate body from the base. Therefore, the space for extinguishing the arc is expanded without changing a shape of the base. As a result, the space for extinguishing the arc is expanded while suppressing an increase in manufacturing cost.

The magnet may be disposed above the fixed contact and the movable contact. In this case, the Lorentz force can act on the arc without the magnet interfering with a movement of the movable piece.

The movable contact may contact and separate from the fixed contact by moving in a front-rear direction. The Lorentz force may act in a left-right direction. The base holder may be disposed at least in the left-right direction of the base. In this case, the space for extinguishing the arc is expanded in the left-right direction on which the Lorentz force acts.

A direction in which the movable contact contacts the fixed contact is defined as forward. A direction in which the movable contact separates from the fixed contact is defined as rearward. The base holder may include a front holder portion, a rear holder portion, a left holder portion, and a right holder portion. The front holder portion may be disposed in front of the base. The rear holder portion may be disposed behind the base. The left holder portion may be disposed on a left side of the base. The right holder portion may be disposed on a right side of the base. In this case, the base holder is disposed on the front, rear, left and right sides of the base. Therefore, the base holder is firmly attached to the base.

The base holder may include an opening. The base may be disposed in the opening. In this case, the base holder can be easily attached to the base.

The base holder may include a holder frame and a convex portion. The holder frame may include an opening. The convex portion may protrude into the opening from the holder frame. The protrusion may contact the base from above. In this case, the convex portion prevents the base from coming off upward. As a result, the base holder is stably attached to the base.

The base holder may include a protrusion. The protrusion may protrude into the opening from the holder frame. The protrusion may support the base from below. In this case, the protrusion prevents the base from coming off downward. As a result, the base holder is stably attached to the base.

The base holder may include a step portion that supports the case from below. In this case, the case is stably supported by the base holder.

The case may include a magnet chamber. The magnet chamber may be disposed above the fixed contact and the movable contact. The magnet chamber may be partitioned from a space in the case. The magnet may be stored in the magnet chamber. In this case, the magnet can be easily disposed near the fixed contact and the movable contact.

The case may further include a lid that closes the magnet chamber and is made of a soft magnetic material. In this case, the lid functions as a yoke, so that the magnetic flux of the magnet is collected around the contacts. In addition, the magnetic flux of the magnet is less likely to leak out of the electromagnetic relay.

DETAILED DESCRIPTION

Figure 1:
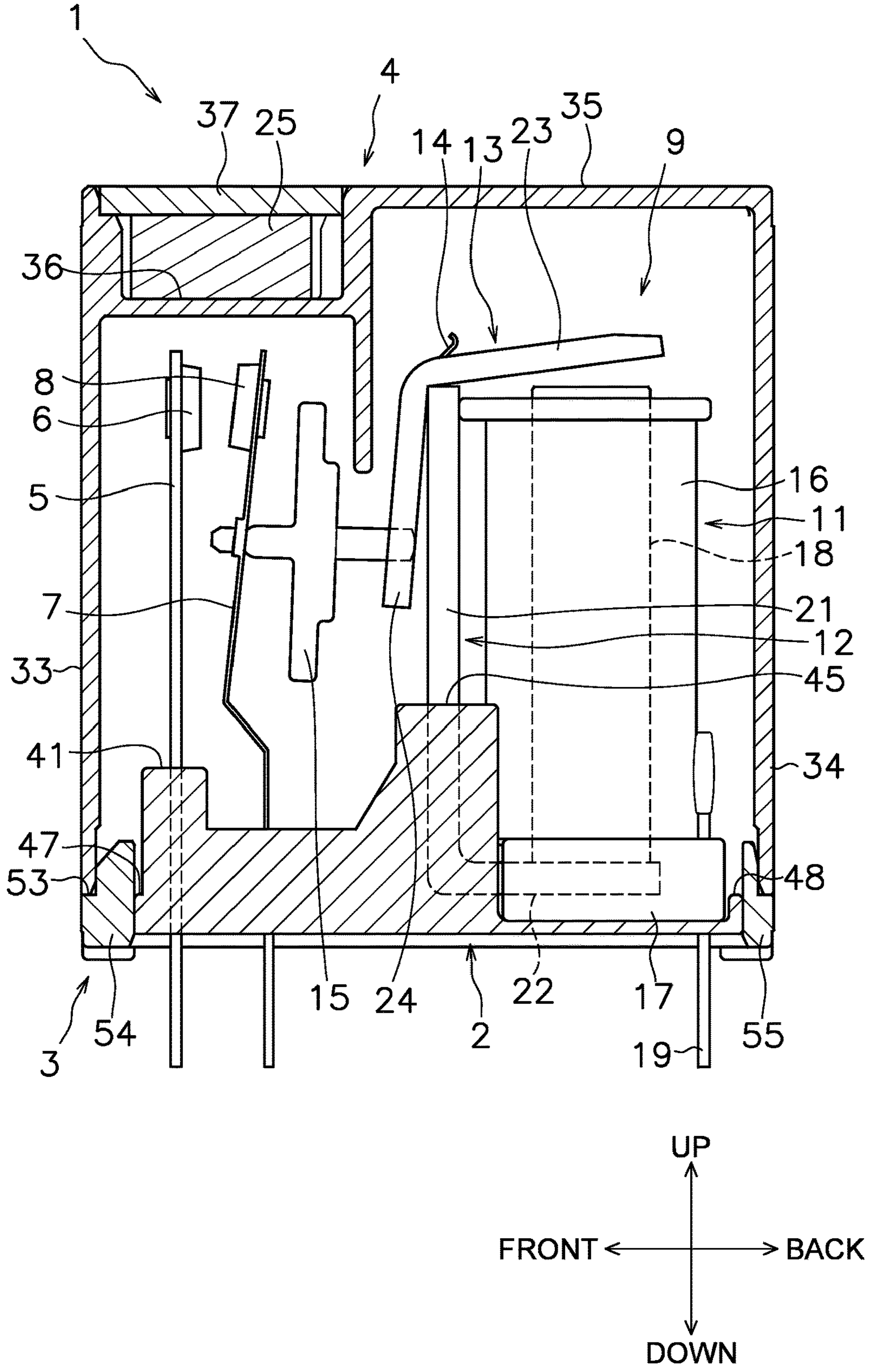
FIG. 1 is a side view of an electromagnetic relay in an open state according to an embodiment.

Hereinafter, an electromagnetic relay 1 according to an embodiment will be described with reference to the drawings. FIG. 1 is a side view of the electromagnetic relay 1 according to the embodiment. As shown in FIG. 1, the electromagnetic relay 1 includes a base 2, a base holder 3, a case 4, a fixed terminal 5, a fixed contact 6, a movable piece 7, a movable contact 8, and a drive device 9. In the following description, a direction in which the contacts 6 and 8 are disposed with respect to the base 2 is defined as upward, and the opposite is defined as downward. A direction from the movable contact 8 to the fixed contact 6 is defined as a front, and the opposite is defined as a rear. A left when facing forward is defined as a left and the opposite is defined as a right. It should be noted that the definitions of these directions are used for convenience of explanation, and do not limit the arrangement direction of the electromagnetic relay 1.

The base 2 supports the fixed terminal 5, the movable piece 7, and the drive device 9. The base holder 3 is attached to the base 2. The base 2 and the base holder 3 are made of, for example, resin. The base 2 and the base holder 3 will be described in detail later. The case 4 is attached to the base holder 3. The case 4 covers the base 2, the base holder 3, the movable contact 8, the fixed contact 6, and the drive device 9.

The fixed terminal 5 extends upward from the base 2. The fixed contact 6 is connected to the fixed terminal 5. The fixed terminal 5 projects downward from the base 2. The movable piece 7 extends upward from the base 2. The movable contact 8 is connected to the movable piece 7. The movable contact 8 faces the fixed contact 6 in the front-rear direction. The movable piece 7 projects downward from the base 2.

The drive device 9 moves the movable piece 7 in a contact direction and an opening direction. The contact direction is a direction in which the movable contact 8 contacts the fixed contact 6. The opening direction is a direction in which the movable contact 8 is separated from the fixed contact 6. The drive device 9 includes a coil block 11, a yoke 12, an armature 13, a hinge spring 14, and a card 15. The coil block 11 includes a coil 16, a spool 17, and an iron core 18. The coil 16 is wound around the spool 17. The spool 17 is supported by the base 2. When energized, the coil 16 generates a magnetic force that moves the movable piece 7. A coil terminal 19 is connected to the coil 16. The coil terminal 19 is supported by the base 2. The coil terminal 19 projects downward from the base 2.

The iron core 18 is disposed in the spool 17. The iron core 18 extends in an axial direction of the coil 16. The yoke 12 is supported by the base 2. The yoke 12 includes a first yoke 21 and a second yoke 22. The yoke 12 has a bent shape between the first yoke 21 and the second yoke 22. The first yoke 21 is disposed in front of the coil 16. The first yoke 21 extends in a vertical direction of the electromagnetic relay 1. The second yoke 22 extends in a front-rear direction of the electromagnetic relay 1. The second yoke 22 is connected to a lower end of the iron core 18.

The armature 13 is swingably supported by the yoke 12. The armature 13 includes a first portion 23 and a second portion 24. The armature 13 has a bent shape between the first portion 23 and the second portion 24. The first portion 23 faces an upper end of the iron core 18. The second portion 24 is connected to the card 15. The card 15 faces the movable piece 7. The card 15 presses the movable piece 7 in the contact direction. The hinge spring 14 is connected to the armature 13. The hinge spring 14 urges the armature 13 in the contact direction.

Figure 2:
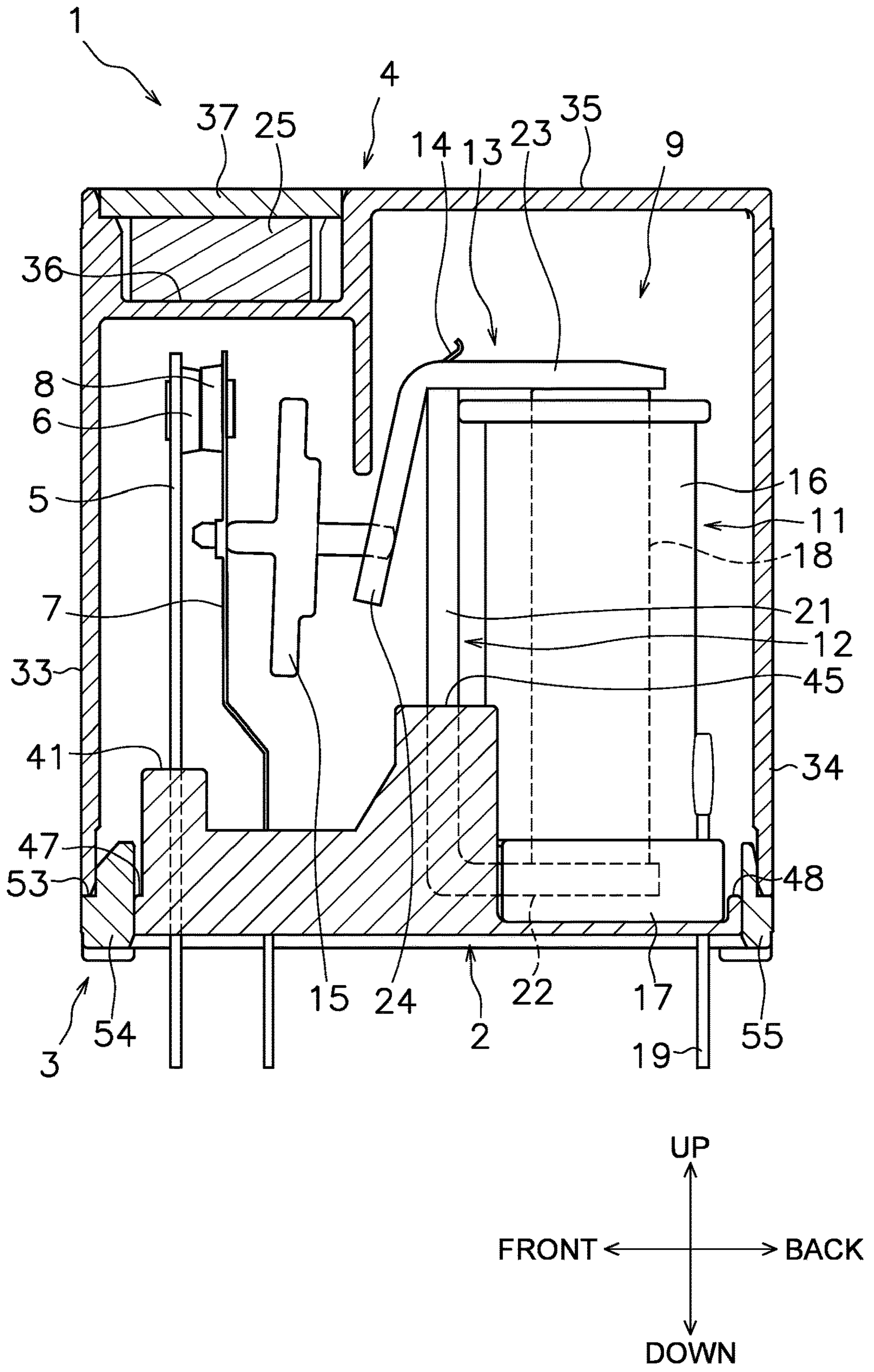
FIG. 2 is a side view of the electromagnetic relay in a closed state.

FIG. 1 shows the electromagnetic relay 1 in an open state. As shown in FIG. 1, in a state where no current is flowing through the coil 16, the movable contact 8 is held at a position apart from the fixed contact 6 by the elastic force of the movable piece 7. When a current flows through the coil 16, the magnetic force of the coil 16 attracts the first portion 23 of the armature 13 to the iron core 18. As a result, the armature 13 swings in the contact direction against the elastic force of the movable piece 7, and the second portion 24 moves in the contact direction. Then, the card 15 moves in the contact direction and presses the movable piece 7 in the contact direction. As a result, as shown in FIG. 2, the movable piece 7 is elastically deformed, and the movable contact 8 contacts the fixed contact 6. As a result, the electromagnetic relay 1 is in a closed state shown in FIG. 2.

When the current to the coil 16 is cut off, the attraction of the armature 13 by the iron core 18 is stopped. Therefore, the elastic force of the movable piece 7 causes the armature 13 to swing in the opening direction. As a result, the first portion 23 is separated from the iron core 18, and the card 15 moves in the opening direction. Further, the elastic force of the movable piece 7 separates the movable contact 8 from the fixed contact 6. As a result, the electromagnetic relay 1 returns to the open state shown in FIG. 1.

Figure 3:
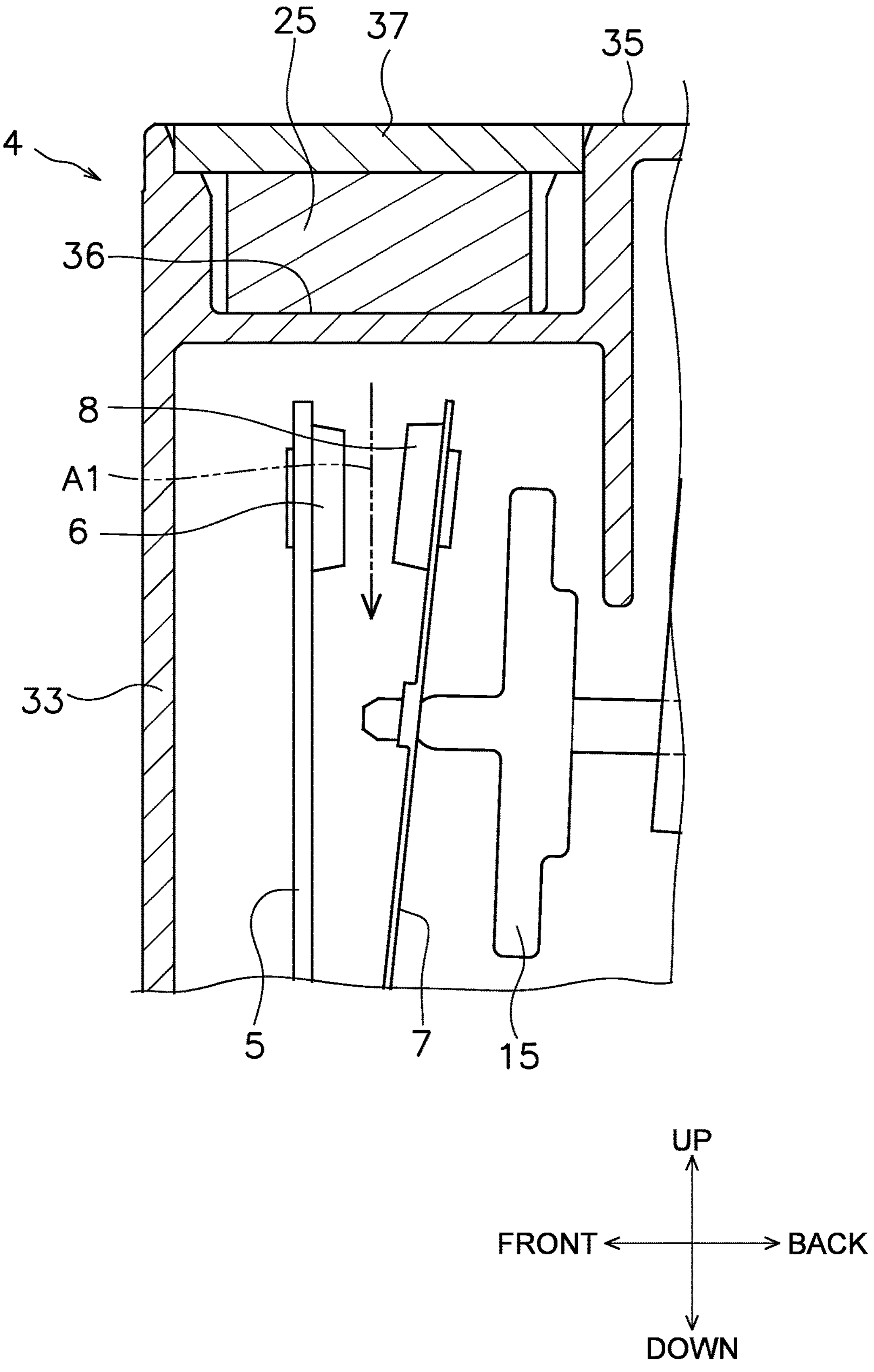
FIG. 3 is an enlarged side view of the electromagnetic relay.
Figure 4:
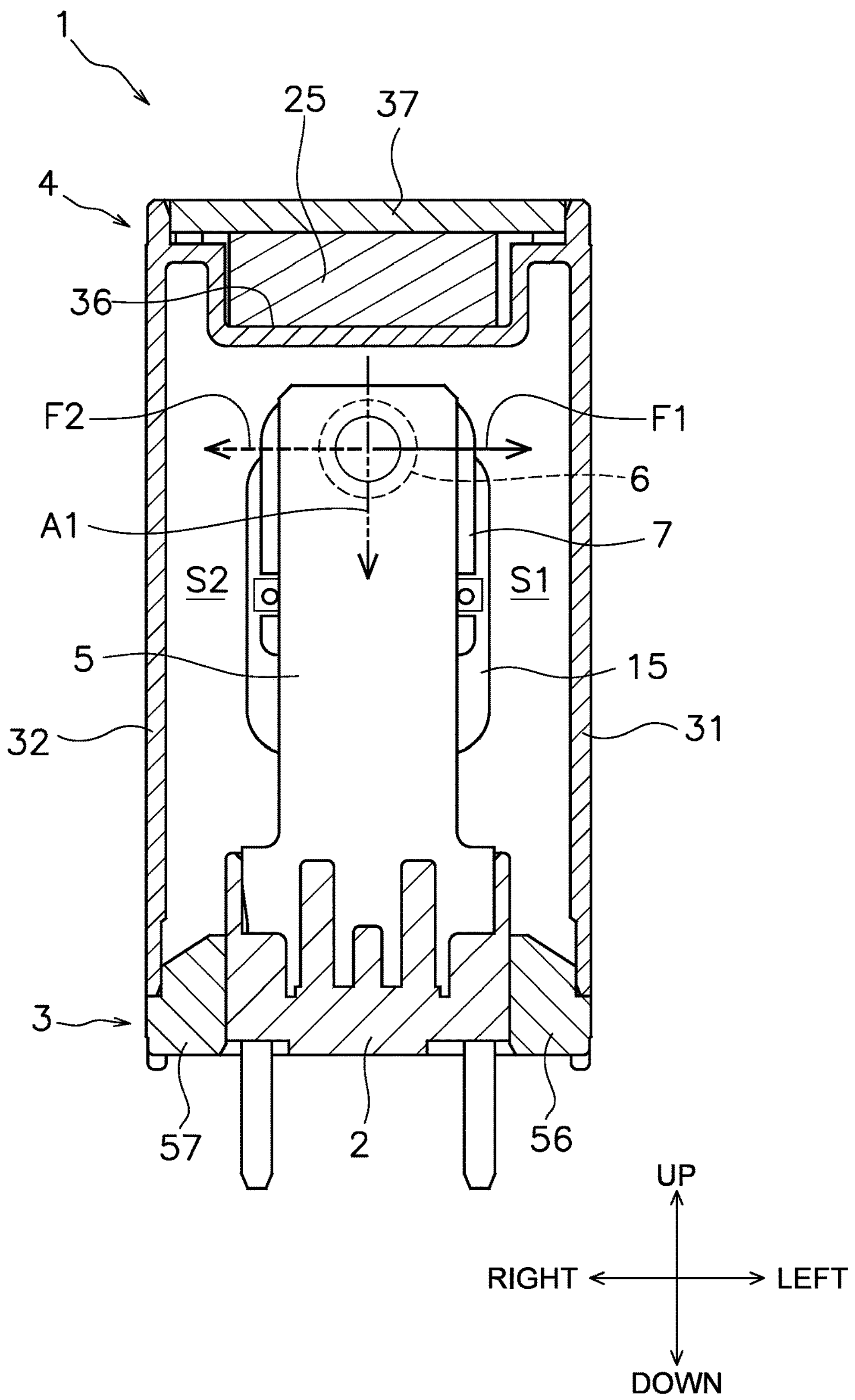
FIG. 4 is a front view of the electromagnetic relay.

When the movable contact 8 separates from the fixed contact 6, an arc may be generated between the contacts 6 and 8. As shown in FIG. 1, the electromagnetic relay 1 includes a magnet 25 for extinguishing an arc. The magnet 25 is disposed above the fixed contact 6 and the movable contact 8. FIG. 3 is an enlarged side view of the electromagnetic relay 1. FIG. 4 is a front view of the electromagnetic relay 1. In FIGS. 3 and 4, an arrow A1 indicates a direction of the magnetic field of the magnet 25. As shown in FIGS. 3 and 4, the magnet 25 is disposed so as to generate a magnetic field in the vertical direction between the fixed contact 6 and the movable contact 8. For example, the magnet 25 generates a downward magnetic field between the fixed contact 6 and the movable contact 8. Alternatively, the magnet 25 may generate an upward magnetic field between the fixed contact 6 and the movable contact 8.

The magnet 25 exerts a Lorentz force on the arc generated between the fixed contact 6 and the movable contact 8. Hereinafter, the Lorentz force when the magnet 25 generates a downward magnetic field between the fixed contact 6 and the movable contact 8 will be described. In FIG. 4, a solid arrow F1 indicates a direction of a Lorentz force (hereinafter referred to as "first Lorentz force") when a current flows from the movable contact 8 toward the fixed contact 6. A broken line arrow F2 indicates a direction of a Lorentz force (hereinafter referred to as "second Lorentz force") when a current flows from the fixed contact 6 toward the movable contact 8. The Lorentz forces F1 and F2 act on the arc in the left-right direction.

As shown in FIGS. 1 and 4, the case 4 includes a first side surface 31, a second side surface 32, a front surface 33, a rear surface 34, and an upper surface 35. The first side surface 31 and the second side surface 32 are disposed apart from each other in the left-right direction. The first side surface 31 is disposed on the left side of the contacts 6 and 8. The second side surface 32 is disposed on the right side of the contacts 6 and 8.

When a current flows from the movable contact 8 toward the fixed contact 6, the first Lorentz force F1 acts on the arc leftward. As a result, the arc is extended to a space (hereinafter referred to as "first space") S1 between the contacts 6 and 8 and the first side surface 31 and extinguished. When a current flows from the fixed contact 6 toward the movable contact 8, the second Lorentz force F2 acts on the arc rightward. As a result, the arc is extended to a space (hereinafter referred to as "second space") S2 between the contacts 6 and 8 and the second side surface 32 and extinguished. When the magnet 25 generates an upward magnetic field between the fixed contact 6 and the movable contact 8, the Lorentz forces act in the directions opposite to the above description.

The front surface 33 is disposed in front of the contacts 6 and 8. The rear surface 34 is disposed behind the drive device 9. The upper surface 35 is disposed above the contacts 6 and 8 and the drive device 9. The case 4 includes a magnet chamber 36. The magnet chamber 36 is disposed above the contacts 6 and 8. The magnet chamber 36 has a shape recessed downward from the upper surface 35. The magnet 25 is disposed in the magnet chamber 36. The magnet chamber 36 is partitioned from the space inside the case 4. The magnet chamber 36 is closed by the lid 37. The lid 37 is made of a soft magnetic material. Since the lid 37 is made of the soft magnetic material, the magnetic flux of the magnet 25 is collected around the contacts 6 and 8. Further, the magnetic flux of the magnet 25 is less likely to leak out of the electromagnetic relay 1.

Figure 5:
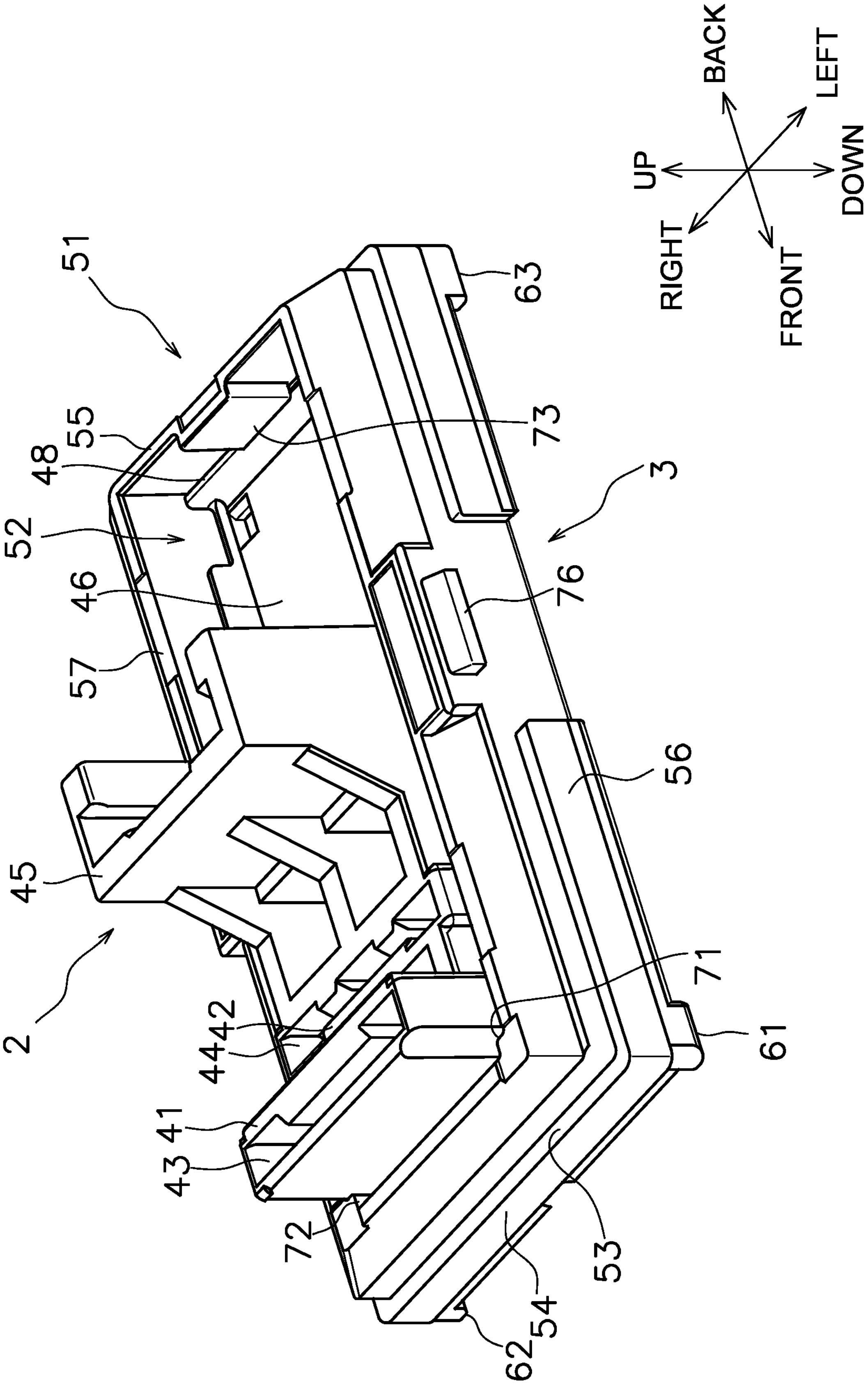
FIG. 5 is a perspective view of a base and a base holder.
Figure 6:
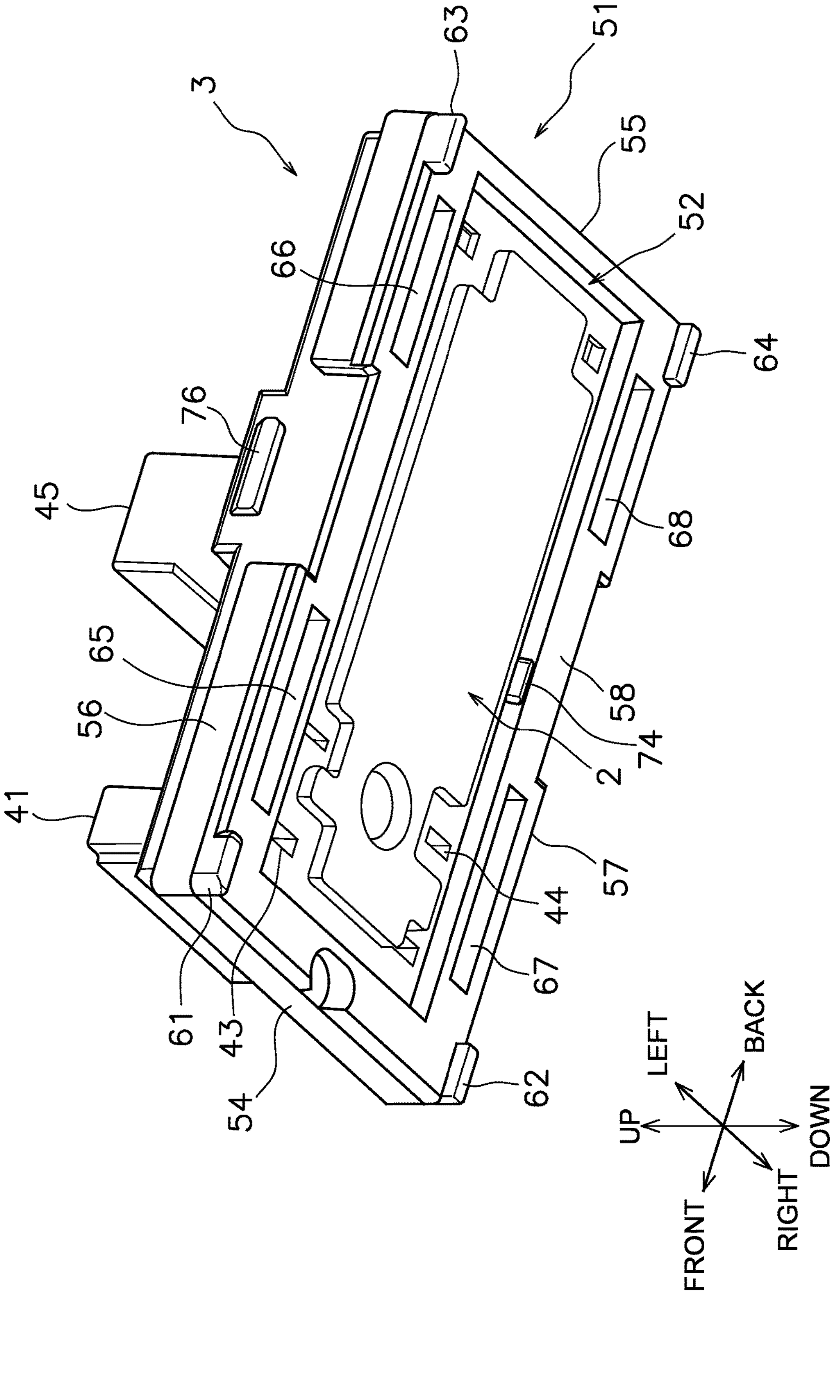
FIG. 6 is a perspective view of the base and the base holder.
Figure 7:
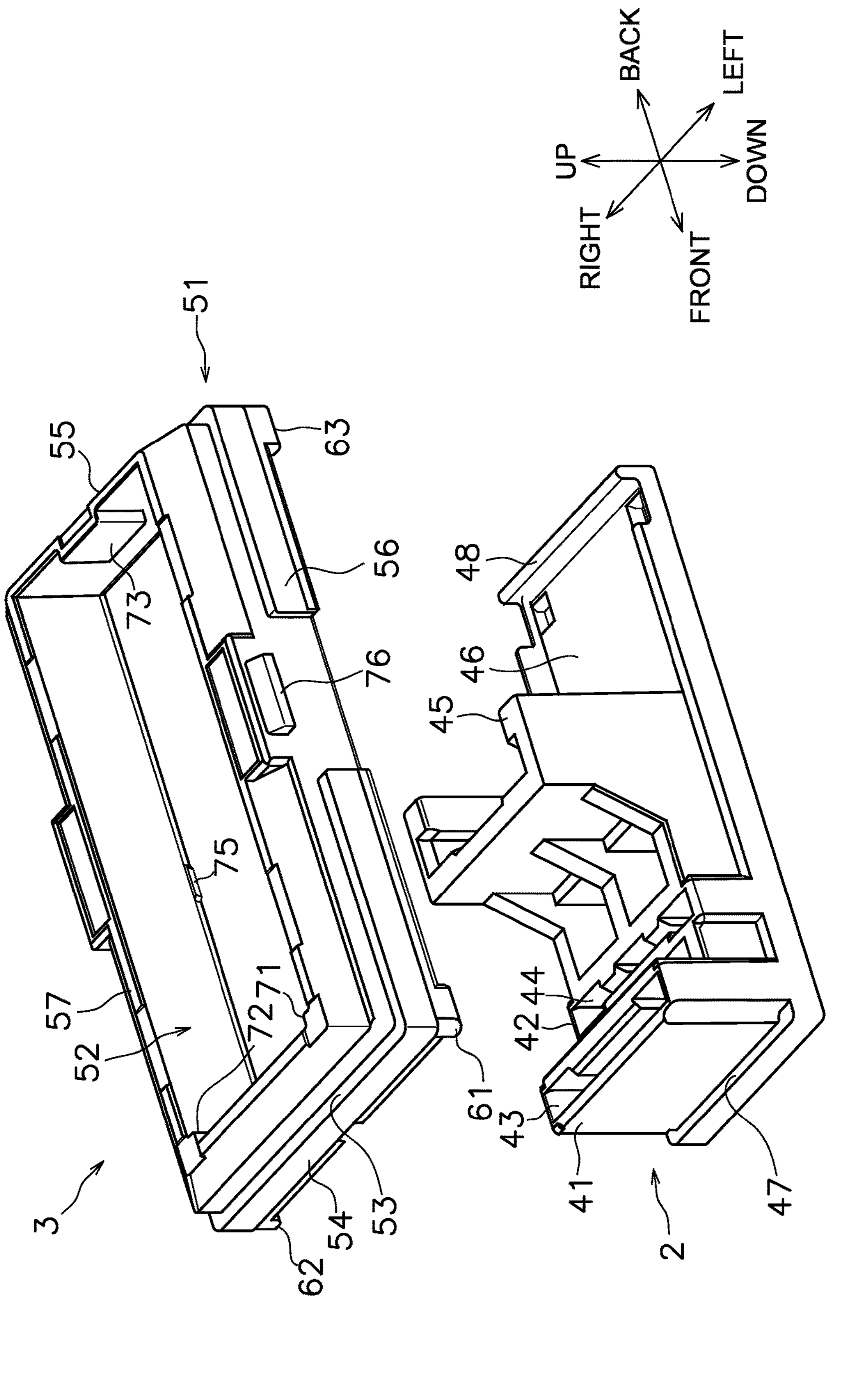
FIG. 7 is an exploded perspective view of the base and the base holder.

FIGS. 5 and 6 are perspective views of the base 2 and the base holder 3. FIG. 7 is an exploded perspective view of the base 2 and the base holder 3. As shown in FIGS. 5 to 7, the base 2 includes a first support portion 41 and a second support portion 42. The first support portion 41 supports the fixed terminal 5. The first support portion 41 includes a first hole 43 extending through the base 2 in the vertical direction. The fixed terminal 5 is passed through the first hole 43. The second support portion 42 supports the movable piece 7. The second support portion 42 includes a second hole 44 extending through the base 2 in the vertical direction. The movable piece 7 is passed through the second hole 44.

The base 2 includes a yoke support portion 45 and a coil support portion 46. The yoke support portion 45 extends upward from the upper surface 35 of the base 2. The yoke support portion 45 supports the yoke 12. The coil support portion 46 supports the coil block 11. The base 2 includes a front edge 47 and a rear edge 48. The front edge 47 is disposed in front of the first support portion 41. The rear edge 48 is disposed behind the coil support portion 46.

The base holder 3 is a separate body from the base 2. The base holder 3 is disposed on the front, rear, left, and right sides of the base 2. Specifically, the base holder 3 includes a holder frame 51. The holder frame 51 includes an opening 52. The base 2 is disposed in the opening 52. The holder frame 51 includes a step portion 53. The step portion 53 is provided along an outer edge of the holder frame 51. The step portion 53 supports the case 4 from below.

The holder frame 51 includes a front holder portion 54, a rear holder portion 55, a left holder portion 56, and a right holder portion 57. The front holder portion 54 is disposed in front of the base 2. The front holder portion 54 extends in the left-right direction. The rear holder portion 55 is disposed behind the base 2. The rear holder portion 55 extends in the left-right direction. The left holder portion 56 is disposed on the left side of the base 2. The left holder portion 56 extends in the front-rear direction. The left holder portion 56 is connected to the front holder portion 54 and the rear holder portion 55. The right holder portion 57 is disposed on the right side of the base 2. The right holder portion 57 extends in the front-rear direction. The right holder portion 57 is connected to the front holder portion 54 and the rear holder portion 55.

As shown in FIG. 4, the left holder portion 56 is disposed in a direction in which the first Lorentz force F1 acts with respect to the base 2. The arc is extended to the first space S1 above the left holder portion 56 by the first Lorentz force F1. The right holder portion 57 is disposed in a direction in which the second Lorentz force F2 acts with respect to the base 2. The arc is extended to the second space S2 above the right holder portion 57 by the second Lorentz force F2.

Figure 8:
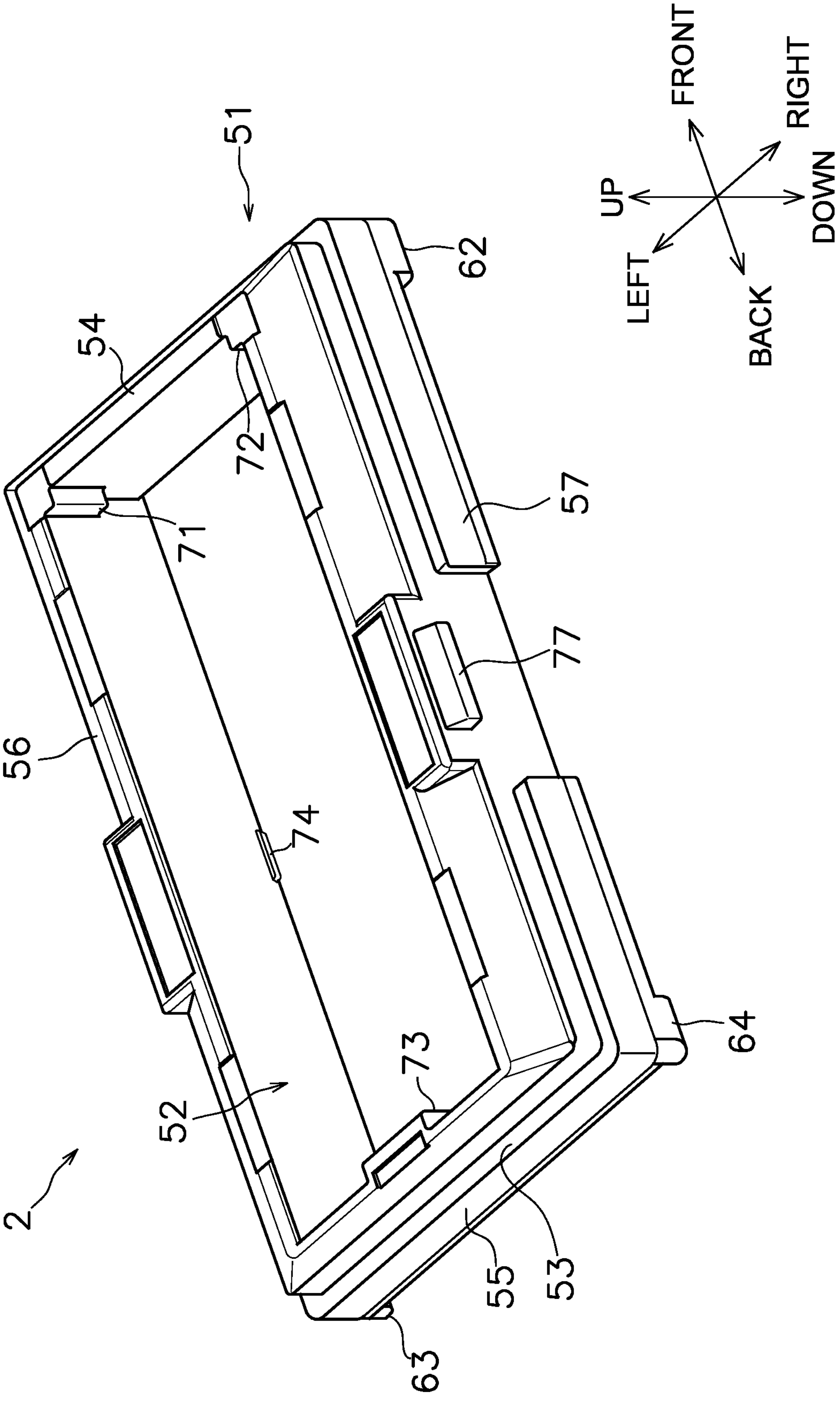
FIG. 8 is a perspective view of the base holder.
Figure 9:
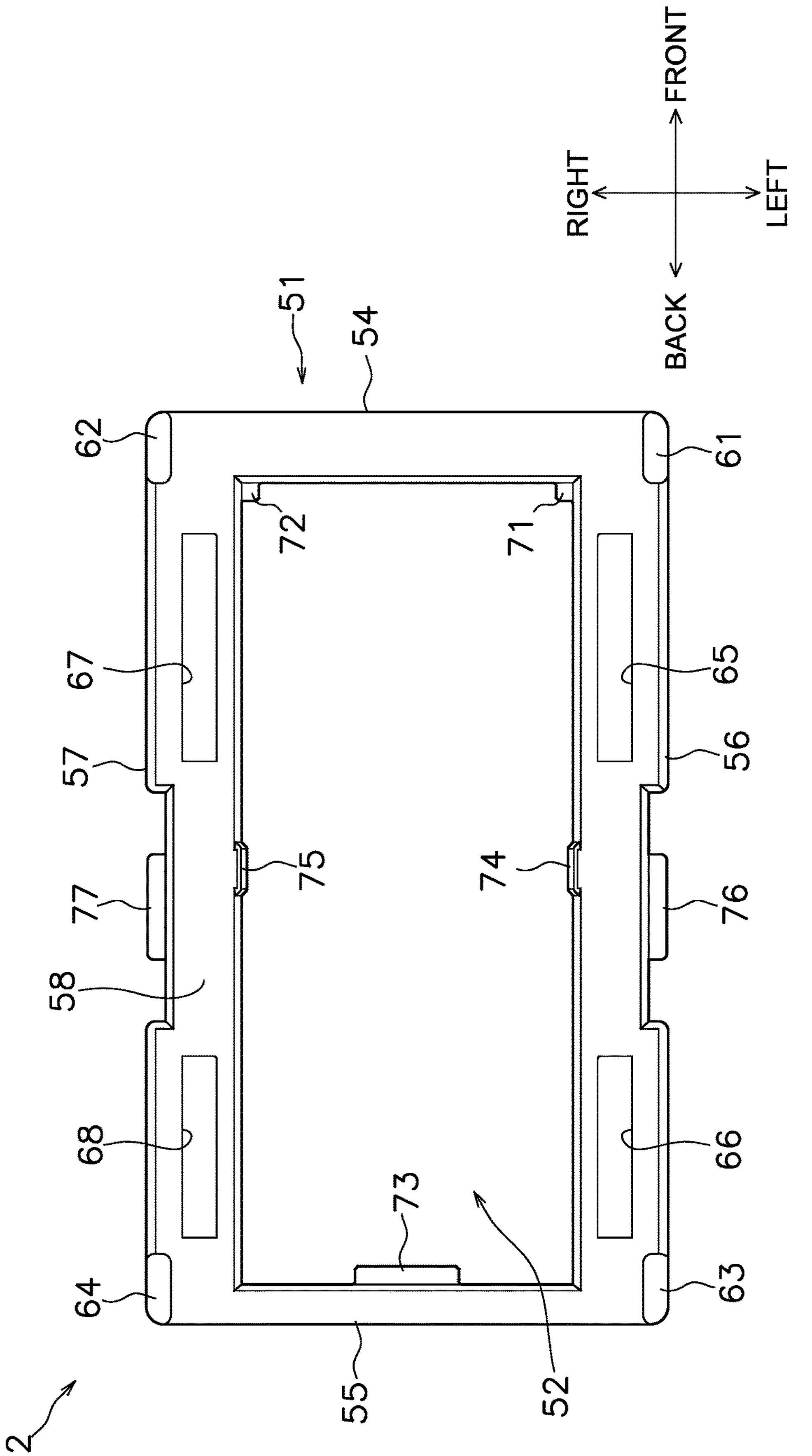
FIG. 9 is a bottom view of the base holder.

FIG. 8 is a perspective view of the base holder 3. FIG. 9 is a bottom view of the base holder 3. As shown in FIGS. 8 and 9, the base holder 3 includes a plurality of legs 61 to 64. The plurality of legs 61 to 64 project downward from the bottom surface 58 of the holder frame 51. The plurality of legs 61 to 64 include a first leg 61, a second leg 62, a third leg 63, and a fourth leg 64. The first to fourth legs 61 to 64 are disposed at four corners of the bottom surface 58 of the holder frame 51, respectively.

The base holder 3 includes a plurality of recesses 65 to 68. The plurality of recesses 65 to 68 have a shape recessed upward from the bottom surface 58 of the holder frame 51. The plurality of recesses 65 to 68 include a first recess 65, a second recess 66, a third recess 67, and a fourth recess 68. The first recess 65 and the second recess 66 are provided on the bottom surface of the left holder portion 56. The first recess 65 and the second recess 66 extend in the front-rear direction. The third recess 67 and the fourth recess 68 are provided on the bottom surface of the right holder portion 57. The third recess 67 and the fourth recess 68 extend in the front-rear direction. The plurality of recesses 65 to 68 may be omitted.

The base holder 3 includes a plurality of convex portions 71 to 73. The plurality of convex portions 71 to 73 project from the holder frame 51 into the opening 52. The plurality of convex portions 71 to 73 are in contact with the base 2 from above. The plurality of convex portions 71 to 73 include a first convex portion 71, a second convex portion 72, and a third convex portion 73. The first convex portion 71 and the second convex portion 72 are disposed at corners of the opening 52. The first convex portion 71 is disposed at the corner between the front holder portion 54 and the left holder portion 56. The second convex portion 72 is disposed at the corner between the front holder portion 54 and the right holder portion 57. The first convex portion 71 and the second convex portion 72 are disposed above the front edge 47 of the base 2. The first convex portion 71 and the second convex portion 72 are in contact with the front edge 47 of the base 2 from above. The third convex portion 73 projects forward from the rear holder portion 55. The third convex portion 73 is disposed above the rear edge 48 of the base 2. The third convex portion 73 is in contact with the rear edge 48 of the base 2 from above.

As shown in FIG. 9, the base holder 3 includes a plurality of protrusions 74 and 75. The plurality of protrusions 74 and 75 project from the holder frame 51 into the opening 52. The plurality of protrusions 74 and 75 support the base 2 from below. The plurality of protrusions 74 and 75 include a first protrusion 74 and a second protrusion 75. The first protrusion 74 projects from the left holder portion 56 into the opening 52. The second protrusion 75 projects from the right holder portion 57 into the opening 52. The first protrusion 74 and the second protrusion 75 are disposed below the base 2. The base 2 is inserted into the opening 52 from below the base holder 3 by press fitting, and is disposed between the plurality of convex portions 71 to 73 and the plurality of protrusions 74 and 75. The base 2 is held by the base holder 3 by being sandwiched between the plurality of convex portions 71 to 73 and the plurality of protrusions 74 and 75.

The base holder 3 includes a plurality of locking portions 76 and 77. The plurality of locking portions 76 and 77 are engaged to the case 4. Thereby, the case 4 is attached to the base holder 3. The plurality of locking portions 76 and 77 include a first locking portion 76 and a second locking portion 77. The first locking portion 76 projects from the left holder portion 56. The first locking portion 76 is engaged to the first side surface 31 of the case 4. The second locking portion 77 protrudes from the right holder portion 57. The second locking portion 77 is engaged to the second side surface 32 of the case 4.

In the electromagnetic relay 1 according to the present embodiment described above, the base holder 3 is disposed in at least the direction in which the Lorentz force acts on the base 2. Therefore, in the case 4, the spaces S1 and S2 for extinguishing the arc are expanded in the directions in which the Lorentz forces F1 and F2 act. Further, the base holder 3 is a separate body from the base 2. Therefore, the spaces S1 and S2 for extinguishing the arc are expanded without changing the shape of the base 2. As a result, the spaces S1 and S2 for extinguishing the arc are expanded while suppressing the increase in the manufacturing cost.

Although one embodiment of the present invention has been described above, the present invention is not limited to the above embodiment, and various modifications can be made without departing from the gist of the invention.

The structure of the fixed contact 6 and the fixed terminal 5 is not limited to that of the above embodiment, and may be changed. For example, the fixed contact 6 and the fixed terminal 5 are not limited to separate bodies from each other, but may be integrated. The structures of the movable contact 8 and the movable piece 7 are not limited to those of the above embodiment, and may be modified. For example, the movable contact 8 and the movable piece 7 are not limited to separate bodies from each other, but may be integrated.

The structure of the drive device 9 is not limited to that of the above embodiment, and may be changed. For example, the shape of the card 15 may be changed. The shape of the armature 13 may be changed.

The structures of the base 2 and the base holder 3 are not limited to those of the above-described embodiment, and may be modified. For example, the rear holder portion 55 or the front holder portion 54 may be omitted. Only one of the left holder portion 56 and the right holder portion 57 may be provided. For example, when the Lorentz force acts only on the left side of the contacts 6 and 8, the right holder portion 57 may be omitted. Alternatively, when the Lorentz force acts only on the right side of the contacts 6 and 8, the left holder portion 56 may be omitted.

The structure of the convex portion is not limited to that of the above embodiment, and may be changed. For example, the arrangement of the convex portions may be changed. The number of the convex portions is not limited to three, and may be more than three or less than three. The arrangement of the protrusions may be changed. The number of protrusions is not limited to two, and may be one or more than two.

REFERENCE NUMERALS

2: Base, 3: Base holder, 4: Case, 5: Fixed terminal, 6: Fixed contact, 7: Movable piece, 8: Movable contact, 25: Magnet, 36: Magnet chamber, 51: Holder frame, 52: Opening, 53: Step portion, 54: Front holder portion, 55: Rear holder portion, 56: Left holder portion, 57: Right holder portion, 71: Convex portion, 74: Protrusion

The invention claimed is:

1. An electromagnetic relay comprising:
- a base;
- a fixed terminal supported by the base;
- a fixed contact connected to the fixed terminal;
- a movable piece supported by the base;
- a movable contact connected to the movable piece, the movable contact facing the fixed contact;
- a magnet configured to exert a Lorentz force on an arc generated between the fixed contact and the movable contact;
- a base holder attached to the base, the base holder being a separate body from the base, the base holder being disposed in at least a direction in which the Lorentz force acts with respect to the base; and
- a case attached to the base holder;
- wherein the movable contact is configured to contact and separate from the fixed contact by moving in a front-rear direction of the electromagnetic relay,
- the Lorentz force acts in a left-right direction of the electromagnetic relay,
- the base holder is disposed at least in the left-right direction with respect to the base,
- a direction in which the movable contact contacts the fixed contact is defined as forward,
- a direction in which the movable contact is separated from the fixed contact is defined as rearward, and
- the base holder includes
  - a front holder portion disposed in front of the base,
  - a rear holder portion disposed behind the base,
  - a left holder portion disposed on a left side of the base, and
  - a right holder portion disposed on a right side of the base.

2. The electromagnetic relay according to claim 1, wherein the magnet is disposed above the fixed contact and the movable contact.

3. The electromagnetic relay according to claim 1, wherein
- the base holder includes an opening, and
- the base is disposed in the opening.

4. The electromagnetic relay according to claim 1, wherein the base holder includes a step portion that supports the case from below.

5. The electromagnetic relay according to claim 1, wherein
- the case includes a magnet chamber disposed above the fixed contact and the movable contact,
- the magnet chamber is partitioned from a space in the case, and the magnet is disposed in the magnet chamber.

6. The electromagnetic relay according to claim 1, wherein the case further includes a lid made of a soft magnetic material, and the lid closes the magnet chamber.

7. An electromagnetic relay comprising:

a base;

a fixed terminal supported by the base;

a fixed contact connected to the fixed terminal;

a movable piece supported by the base;

a movable contact connected to the movable piece, the movable contact facing the fixed contact;

a magnet configured to exert a Lorentz force on an arc generated between the fixed contact and the movable contact;

a base holder attached to the base, the base holder being a separate body from the base, the base holder being disposed in at least a direction in which the Lorentz force acts with respect to the base; and a case attached to the base holder;

wherein the base holder includes an opening, the base is disposed in the opening, and the base holder includes a holder frame in which the opening is disposed, and a convex portion that protrudes into the opening from the holder frame and contacts the base from above.

8. An electromagnetic relay comprising:

a base;

a fixed terminal supported by the base;

a fixed contact connected to the fixed terminal;

a movable piece supported by the base;

a movable contact connected to the movable piece, the movable contact facing the fixed contact;

a magnet configured to exert a Lorentz force on an arc generated between the fixed contact and the movable contact;

a base holder attached to the base, the base holder being a separate body from the base, the base holder being disposed in at least a direction in which the Lorentz force acts with respect to the base; and a case attached to the base holder;

wherein the base holder includes an opening, the base is disposed in the opening, and the base holder includes a holder frame in which the opening is disposed, and a protrusion that projects from the holder frame into the opening and supports the base from below.

* * * * *